(12) United States Patent
Lammers et al.

(10) Patent No.: US 10,651,663 B2
(45) Date of Patent: May 12, 2020

(54) CHARGING SYSTEM AND METHOD

(71) Applicant: NXP B.V., Eindhoven (NL)

(72) Inventors: Matheus Johannus Gerardus Lammers, Nederweert (NL); Wilhelmus Johannes Wilhelmina Kitzen, Waalre (NL); Klaas Brink, Waalre (NL); Patrick Niessen, Eindhoven (NL)

(73) Assignee: NXP B.V., Eindhoven (NL)

( * ) Notice: Subject to any disclaimer, the term of this patent is extended or adjusted under 35 U.S.C. 154(b) by 44 days.

(21) Appl. No.: 15/625,886

(22) Filed: Jun. 16, 2017

(65) Prior Publication Data

US 2018/0366961 A1 Dec. 20, 2018

(51) Int. Cl.
*H02J 7/00* (2006.01)
*H02J 50/80* (2016.01)
*G06Q 50/06* (2012.01)
*G07F 15/00* (2006.01)

(52) U.S. Cl.
CPC ............ *H02J 7/0042* (2013.01); *G06Q 50/06* (2013.01); *G07F 15/006* (2013.01); *H02J 7/00036* (2020.01); *H02J 50/80* (2016.02); *H02J 7/00034* (2020.01)

(58) Field of Classification Search
CPC ....... Y02E 60/12; H02J 7/0042; H02J 7/0045; H01M 10/46; H01M 10/44
USPC ...................................................... 320/107
See application file for complete search history.

(56) References Cited

U.S. PATENT DOCUMENTS

| 7,913,246 | B2 | 3/2011 | Hammond et al. | |
|---|---|---|---|---|
| 2007/0024238 | A1* | 2/2007 | Nakade | H02J 7/0004 320/108 |
| 2008/0238357 | A1* | 10/2008 | Bourilkov | H02J 7/0006 320/106 |
| 2010/0013442 | A1* | 1/2010 | Yamazaki | H01M 10/44 320/162 |
| 2011/0248669 | A1* | 10/2011 | Cunanan | B25F 5/021 320/106 |
| 2013/0002192 | A1* | 1/2013 | Fischbach | H02J 7/00 320/107 |
| 2013/0009607 | A1* | 1/2013 | Nishibayashi | B60L 11/1844 320/162 |
| 2013/0024306 | A1* | 1/2013 | Shah | G06Q 20/32 705/17 |
| 2013/0310112 | A1 | 11/2013 | You et al. | |
| 2014/0253025 | A1 | 9/2014 | Van Wiemeersch et al. | |
| 2015/0015182 | A1* | 1/2015 | Brandtman | H02J 7/0027 320/103 |

(Continued)

OTHER PUBLICATIONS

"Universal Serial Bus Power Delivery Firmware Update Specification—DRAFT"; Revision 0.8; 55 pages (Jun. 15, 2016).

*Primary Examiner* — Arun C Williams

(57) ABSTRACT

One example discloses a charging system, including: a charging device configured to be coupled to a device to be charged; wherein the charging device includes a set of hardware defined charging attributes; wherein the charging device is configured to reconfigure the hardware defined charging attributes based on a specific charging protocol received from the device to be charged; and wherein the charging device is configured to output charging power to the device to be charged as defined by the specific charging protocol.

19 Claims, 5 Drawing Sheets

(56) References Cited

U.S. PATENT DOCUMENTS

2016/0046199 A1     2/2016   Butler et al.
2016/0126779 A1     5/2016   Park

\* cited by examiner

CHARGING SYSTEM AND METHOD

The present specification relates to systems, methods, apparatuses, devices, articles of manufacture and instructions for device charging.

SUMMARY

According to an example embodiment, a charging system, comprising: a charging device configured to be coupled to a device to be charged; wherein the charging device includes a set of hardware defined charging attributes; wherein the charging device is configured to reconfigure the hardware defined charging attributes based on a specific charging protocol received from the device to be charged; and wherein the charging device is configured to output charging power to the device to be charged as defined by the specific charging protocol.

In another example embodiment, the specific charging protocol configures the charging device to output at least one of: a specific power level; a specific voltage; a specific amperage; fast-charging; slow-charging; low-noise charging; a power grid loading dependent charging power; a power grid outage dependent power level; a specific VI-profile as a function of time; or a specific modulation of VI.

In another example embodiment, the specific charging protocol configures the charging device to pass signals related to at least one of: locking or unlocking various charging device functionality; real-time feedback of charging device operational attributes; product reliability; remote diagnosis; functionality upgrades; bug repairs; advertising; licensing royalties; quality of the mains; protocol timing or message parameters; safe operating bounds; measurements; or type/model number.

In another example embodiment, the specific charging protocol does not identify the device to be charged.

In another example embodiment, the hardware defined attributes include a set of fixed circuits configured to be enabled or disabled based on the specific charging protocol.

In another example embodiment, the specific charging protocol is not stored in the charging device while the charging device and the device to be charged are uncoupled.

In another example embodiment, the charging device is configured to delete the specific charging protocol from the charging device when the device to be charged is uncoupled from the charging device.

In another example embodiment, the charging device is configured to execute the specific charging protocol as a set of input values which constrain the set of hardware defined charging attributes.

In another example embodiment, the device to be charged is prevented from permanently disabling the set of hardware defined charging attributes.

In another example embodiment, the device to be charged charges an internal power storage device with the charging power.

In another example embodiment, the device to be charged has a maximum input charging power; the charging device has a maximum output charging power; and the charging device is configured to output an actual charging power based on a human interface input on the device to be charged.

In another example embodiment, the actual charging power is less than the maximum input charging power and the maximum output charging power.

In another example embodiment, the actual charging power is set to a first charging power in response to a first user payment, and to a second charging power in response to a second user payment.

In another example embodiment, the device to be charged selects the specific charging protocol using a charging device-app downloaded from a network.

In another example embodiment, the specific charging protocol includes at least one of: a direct charging protocol (DCP); battery monitoring and control; power waveform generation; mains communications connectivity; a safety protocol; and a security protocol.

According to an example embodiment, a method for charging, using a charging device configured to be coupled to a device to be charged, wherein the charging device includes a set of hardware defined charging attributes, comprising: receiving a specific charging protocol at the charging device from the device to be charged; reconfiguring the hardware defined charging attributes based on the specific charging protocol; and outputting charging power from the charging device to the device to be charged as defined by the specific charging protocol.

In another example embodiment, the specific charging protocol configures the charging device to output at least one of: a specific power level; a specific voltage; a specific amperage; fast-charging; slow-charging; low-noise charging; a power grid loading dependent charging power; a power grid outage dependent power level; a specific VI-profile as a function of time; or a specific modulation of VI.

In another example embodiment, the specific charging protocol configures the charging device to pass signals related to at least one of: locking or unlocking various charging device functionality; real-time feedback of charging device operational attributes; product reliability; remote diagnosis; functionality upgrades; bug repairs; advertising; licensing royalties; quality of the mains; protocol timing or message parameters; safe operating bounds; measurements; or type/model number.

In another example embodiment, further comprising: deleting the specific charging protocol from the charging device when the device to be charged is uncoupled from the charging device.

In another example embodiment, further comprising: selecting the specific charging protocol using a charging device-app.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
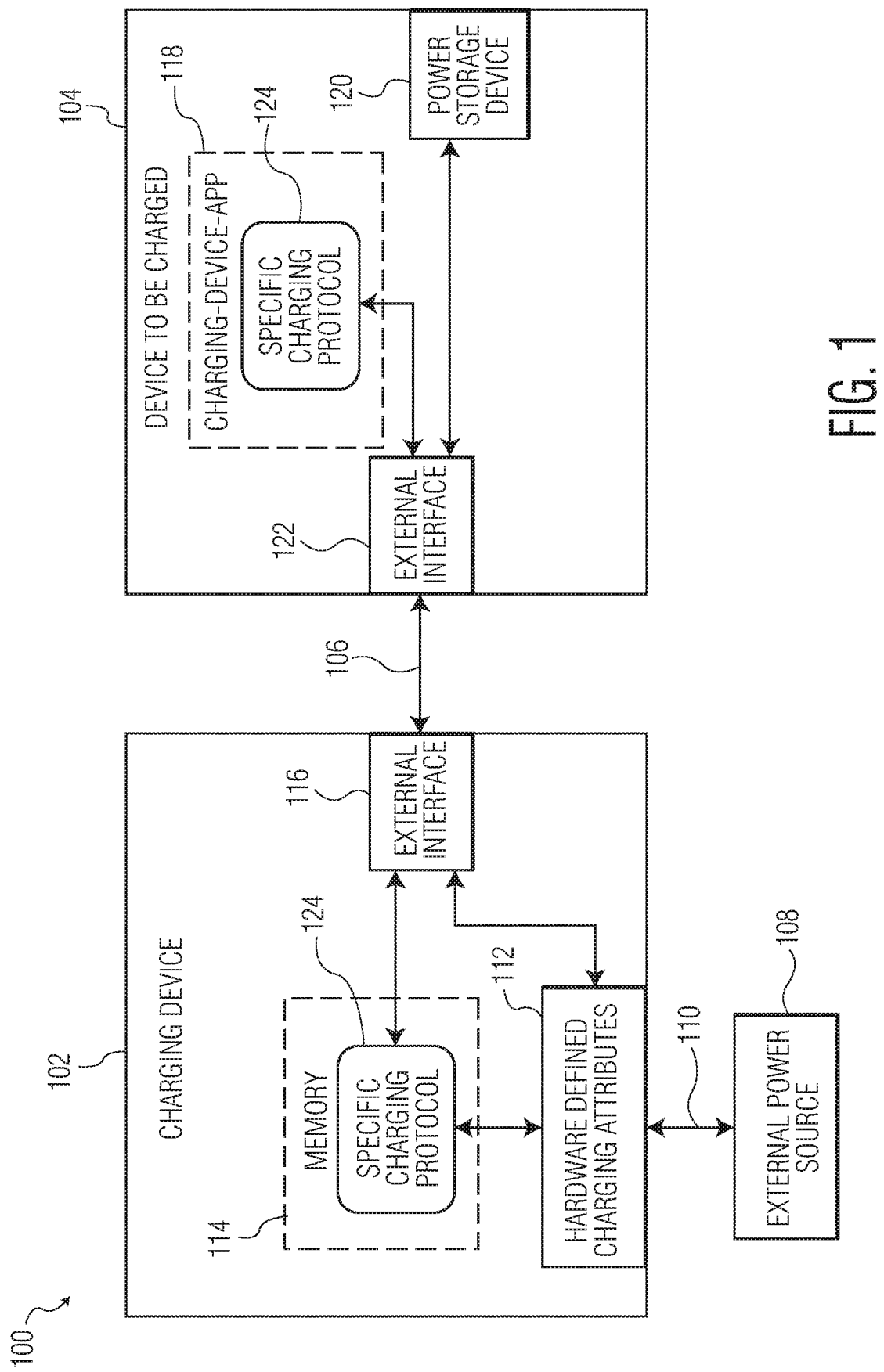
FIG. 1 is a first example $3^{rd}$ generation charging system.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

1st generation charging devices (e.g. power adapters) are fixed function power conversion devices: their output power rating is constant and fixed. Such 1st generation charging device includes either a dedicated IC or a single fixed charging protocol for the only one device that the charging device can charge.

2nd generation charging devices have their power conversion functions defined by multiple sets of charging protocol firmware pre-loaded into the charging device during manufacturing. In response to the device to be charged identifying itself, the charging device is programmed to select one of the charging protocols associated with such identified device to be charged. Manufacturers may or may not release firmware upgrades to solve operational problems or provide enhanced functionality for their particular charging protocol stored in the charging device.

FIG. 1 is a first example $3^{rd}$ generation charging system 100. The first example $3^{rd}$ generation charging system 100 includes a charging device 102 (e.g. power adapter, smart charger, etc.) coupled to a device to be charged 104 with a first interface 106. The charging device 102 is also coupled to an external power source 108 (e.g. mains, grid, etc.) with a second interface 110.

The charging device 102 includes a set of hardware defined charging attributes 112, a memory 114 (e.g RAM), and an external interface 116. The device to be charged 104 includes a charging-device-app 118 (configured to provide or generate a specific charging protocol 124), a power storage device (i.e. a battery) 120, and an external interface 122.

The hardware defined attributes may include a set of fixed circuits configured to be enabled or disabled based on the specific charging protocol 124. Thus the charging device 102 is configured to execute the specific charging protocol 124 as a set of input values which constrain the set of hardware defined charging attributes. Execute is herein defined to include: setting the charging attributes and defining how charging device 102 and device to be charged 104 communicate ("definition of message format & communication parameters").

The charging device 102 is configured to reconfigure the hardware defined charging attributes 112 based on the specific charging protocol 124 received from the device to be charged 104. The charging device 102 then outputs charging power to the device to be charged 104 as defined by the specific charging protocol 124. The device to be charged 104 charges an internal power storage device with the charging power.

In some example embodiments, the specific charging protocol 124 does not identify the device to be charged 104. Also, in some example embodiments, the specific charging protocol 124 is not stored in the charging device 102 while the charging device 102 and the device to be charged 104 are uncoupled.

Some example embodiments of the charging device 102 are configured to delete the specific charging protocol 124 from the charging device 102 when the device to be charged 104 is uncoupled from the charging device 102.

In some example embodiments, the device to be charged 104 has a maximum input charging power, and the charging device 102 has a maximum output charging power. The charging device 102 is then configured to output an actual charging power based on a human interface input on the device to be charged 104. The actual charging power in some examples is less than the maximum input charging power and the maximum output charging power. In other examples, the actual charging power is set to a first charging power in response to a first user payment, and to a second charging power in response to a second user payment.

The charging device 102 thus provides a variable power conversion function based on each unique device to be charged 104 (e.g. various mobile devices, smartphones, etc.) that is connected to the charging device 102. This 3rd generation charging device 102 resolves the problem of having a charging device 102 manufacturer preload separate charging protocols in the charging device 102 for each device to be charged 104.

In various example embodiments, a charging-device-app 118 (i.e. a software application for configuring the charging device 112) is downloaded on either the device to be charged 104, the charging device 102, or both.

The device to be charged 104 selects the specific charging protocol 124 using a charging device 102-app downloaded from a network. The charging-device-app 118 then either temporarily loads the specific charging protocol 124 into the charging device's 102 memory 114 (e.g. RAM), or directly configures the charging device's 102 hardware defined charging attributes 112, so that the charging device 102 can properly charge the device to be charged 104.

The charging-device-app 118 enables the charging device 102 to be configured to provide various functionality and charging powers based on various specific charging protocols 124. Various example embodiments of the charging-device-app 118 allow users to flexibly select and unlock a variety of charging device 102 functionality and charging powers, either for a fee or at the user's or a manufacturer's discretion. Flexibility provided by the charging-device-app 118 also permits in-field upgrades, remote diagnosis, bug repairs, and functionality improvements.

Thus the charging device 102 need not be specific or limited to a limited number of devices to be charged 104, but instead can be generic and configurable based on the specific charging protocol 124 received from the device to be charged 104. Using generic, customizable charging devices 102 is not only be adaptable to many different devices to be charged 104, but is also able to be automatically upgraded for future devices to be charged 104, and power or protocol standards.

Such generic customizable smart chargers allow large production series which result in manufacturing cost reductions.

Generic charging devices 102 also permit other differentiation opportunities as well. For example, a user or device manufacturer could prefer ultra-fast charging accepting a reduction in battery life while another user or manufacturer prefers a battery life saving charging method. In another example, the charging device 102 is set to low-noise operation mode when the phone is in airplane mode (resulting in less spectrum interference). This in some ways resembles mobile apps on a mobile device (e.g. smartphone or tablet) where the apps determine the functionality of the mobile device.

Additional charging-device-apps 118 having associated specific charging protocols 124 can also be downloaded and installed. These apps 118 permit either a manufacturer or a user to further configure, monitor and/or retrieve operational data from the charging device 102. These multiple charging-device-apps 118 in some examples are stored as files in the device to be charged's 104 (e.g. mobile device's) app directory. These apps can be downloaded over a cloud or other network to the device to be charged 104. Various example charging-device-apps 118 are now discussed.

Direct Charging Protocol (DCP) App

The DCP App permits, for example, mobile device manufacturers to define their own specific charging protocol 124. Thus instead of the charging device 102 being preloaded with "N" number of protocols from "N" different device to be charged 104 manufacturers, the device to be charged 104 just downloads the proper specific charging protocol 124 from the manufacturer's network and thereby configures the charging device 102 to work with the device to be charged 104.

Use of temporarily stored specific charging protocols 124 reduces an amount of memory 114 (e.g. ROM/RAM) storage required in the charging device 102 because in some example embodiments a maximum of only one specific charging protocol 124 needs to be loaded into the charging device's 102 memory 114 at any one time.

Battery Monitoring and Control App

These apps could perform (e.g. battery) impedance or other measurements (e.g. system health control, state-of-charge measurement). These apps could be implemented on a computing engine in the charging device 102, since their real-time nature may not tolerate latency and jitter intrinsic to a communication protocol.

Charging methods could be different and possibly over time (depending on state-of-charge) different operating modes could be required. Instead of programming all modes in a single (downloadable) application an alternative approach is to download different applications over time: one for each mode that is required for a complete battery charging cycle.

Signal Generation (Real-time) App

These Apps can generate a particular signal shape (e.g. a sawtooth charging voltage waveform) as adapter output with hard real-time requirements. In some example embodiments, the latency & timing uncertainty intrinsic to a direct charging protocol can be remedied. For instance, the Signal Generation App can generate/construct the required signal shape employing the full capability of the computing resource(s) inside the charging device 102 and limit communication to mode control commands only.

Since some of these charging algorithms include confidential manufacturer information, the Signal Generation App allows the manufacturer to keep and maintain the charging algorithms within customer scope not requiring it to be shared with the (component) supplier.

Mains Communications Connectivity App

Although many mobile devices have a means for RF communication, there are cases where communication over power line could still be favorable over RF communication. For example when the phone is operated in an environment where RF is severely disturbed or even impossible.

A charging device 102 that provides additional (de)modulation capability could serve as an access point to a (secure) network. Alternatively, field diagnosis/service could benefit from the ability to monitor AC signals. For example, from AC signal monitoring it might be possible to conclude that problems are caused by AC net instability.

Safety and/or Security App

The Safety and/or Security App provides a relatively easy way to perform field upgrades to resolve bugs and improve charging device 102 and device to be charged 104 safety. The Safety & Security App can also wipe (i.e. erase) any configuration information from the charging device 102 whenever the mobile device is disconnected, either for security or to prepare the charging device 102 to be connected to a different device to be charged.

The downloadable app allows for improved control of the software that executes on the charging device 102: a secure kernel with only the basic functionality and strong (hardware) security should assure that only trusted applications can execute. In one example embodiment, the user can select a Safety and/or Security App with encryption such that only the device to be charged 104 can control the charging device 102 (e.g. the power adapter).

Changed Functionality App

A charging device 102 equipped with several (temperature) sensors, computing power, supply generation, LEDs etc. can be controlled by the Changed Functionality App. For example, the Changed Functionality App can change operation from mobile device power supply to a charging device 102 for (dimmable) light, or control additional hardware that is controlled from the processing unit found inside the adapter. An I/O expander could provide access to a series of LEDs to indicate battery SOH or indicate the amount of power transferred.

Future Apps.

The platform provided by the charging-device-app 118 and the configurable charging device 102 allows manufacturers and users to unlock the full potential of the charging device 102. Such App controlled charging devices 102 allow for a means of charging device 102 differentiation that permits great creativity.

Figure 2:
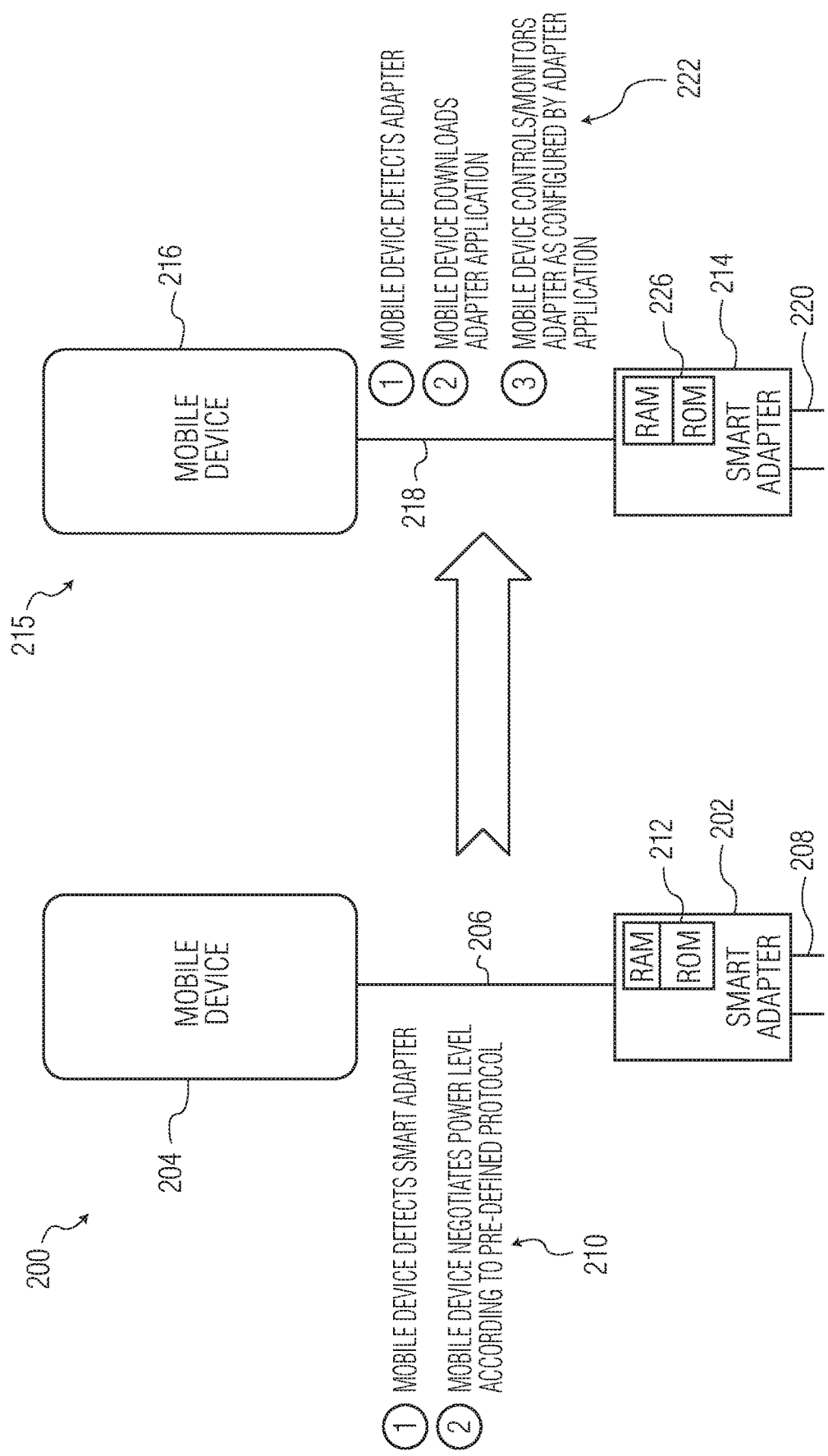
FIG. 2A is an example $2^{nd}$ generation charging system.
FIG. 2B is a second example $3^{rd}$ generation charging system.

FIG. 2A is an example $2^{nd}$ generation charging system 200. The example $2^{nd}$ generation charging system 200 includes a first charging device 202 (e.g. $2^{nd}$ generation smart power adapter) coupled to a device to be charged 204 (e.g. mobile device) with an interface 206 (e.g. power and communications cable). The first charging device 202 is also coupled to an external power source 208 (e.g. mains, grid, etc.).

Preloaded charging protocols 210 (e.g. pre-defined protocols) are pre-stored in a memory 212 (e.g. loaded in ROM) even before the device to be charged 204 is connected. These preloaded charging protocols 210 can take up substantial ROM memory 212, potentially release confidential device to be charged 204 information to the charging device 202 manufacturer and may or may not ever be updated due to a burden placed on an end user to specifically download new firmware onto the charging device 202.

FIG. 2B is a second example $3^{rd}$ generation charging system 215. The second example $3^{rd}$ generation charging system 215 includes a second charging device 214 (e.g. 3rd generation smart power adapter) coupled a device to be charged 216 (e.g. mobile device) with an interface 218 (e.g. power and communications cable). The second charging device 214 is also coupled to an external power source 220 (e.g. mains, grid, etc.).

However here the device to be charged 216 includes a charging-device-app 222 (e.g. power adaptor application) that can download various specific charging protocols 224 over an external network which then configure the second charging device 214 to supply charging power or other information to the device to be charged 216.

Only one specific charging protocol 224 need be loaded in a memory 226 (e.g. loaded in RAM) of the second charging device 214, so a size of the memory 226 can be much smaller than the memory 212 of the first charging device 202.

Figure 3:
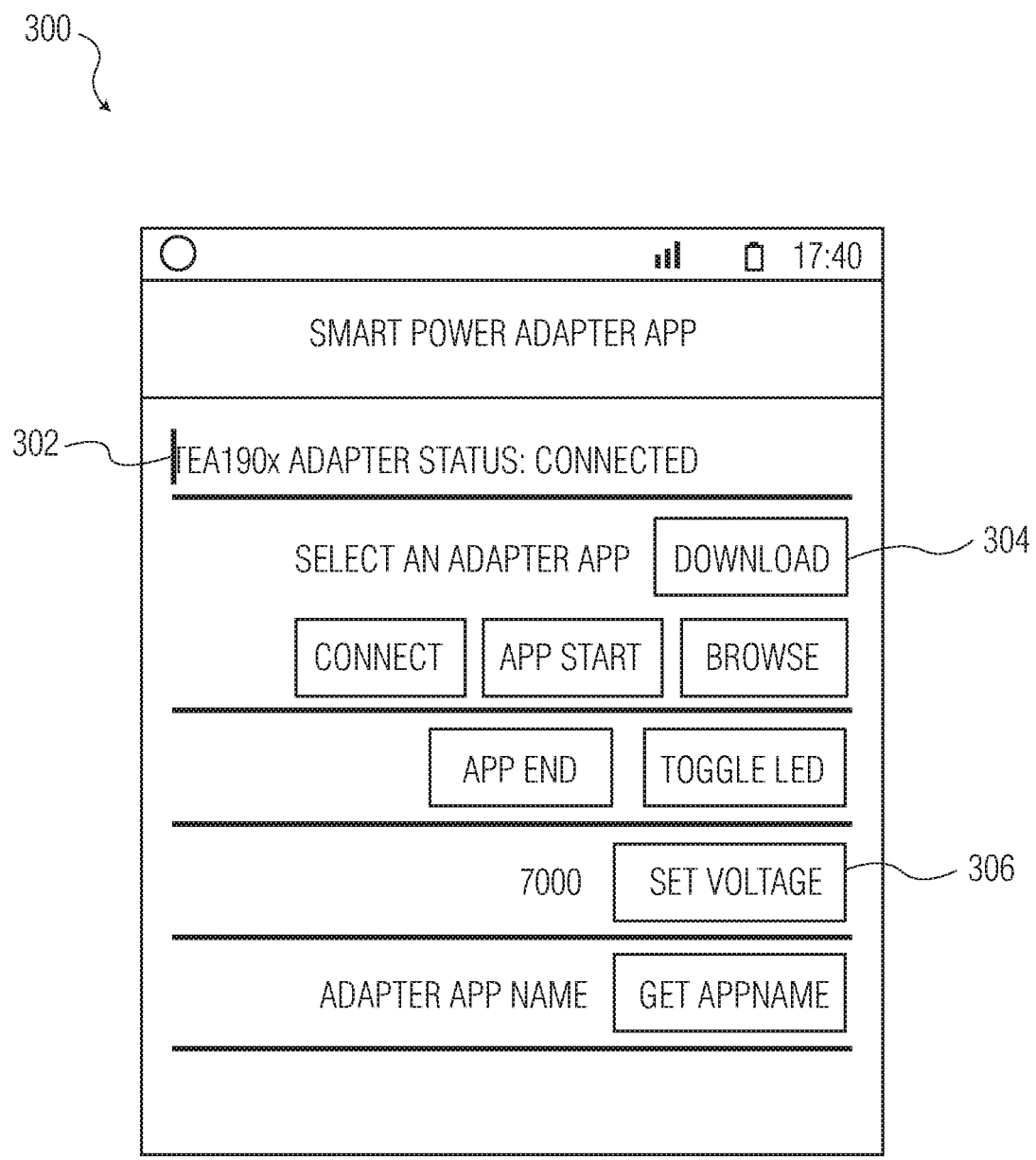
FIG. 3 is an example charging-device-app user interface.

FIG. 3 is an example charging-device-app user interface 300. The example charging-device-app user interface 300 shows a charging-device-app user interface 300, a charging device 102 identification and status 302 (e.g. charging device adapter status: connected), a select specific charging protocol 124 button 304 (e.g. select an adaptor app), and a set voltage 306. Other example embodiments of the charging-device-app can have fewer or a greater number of selection, connectivity, control and monitoring options.

Figure 4:
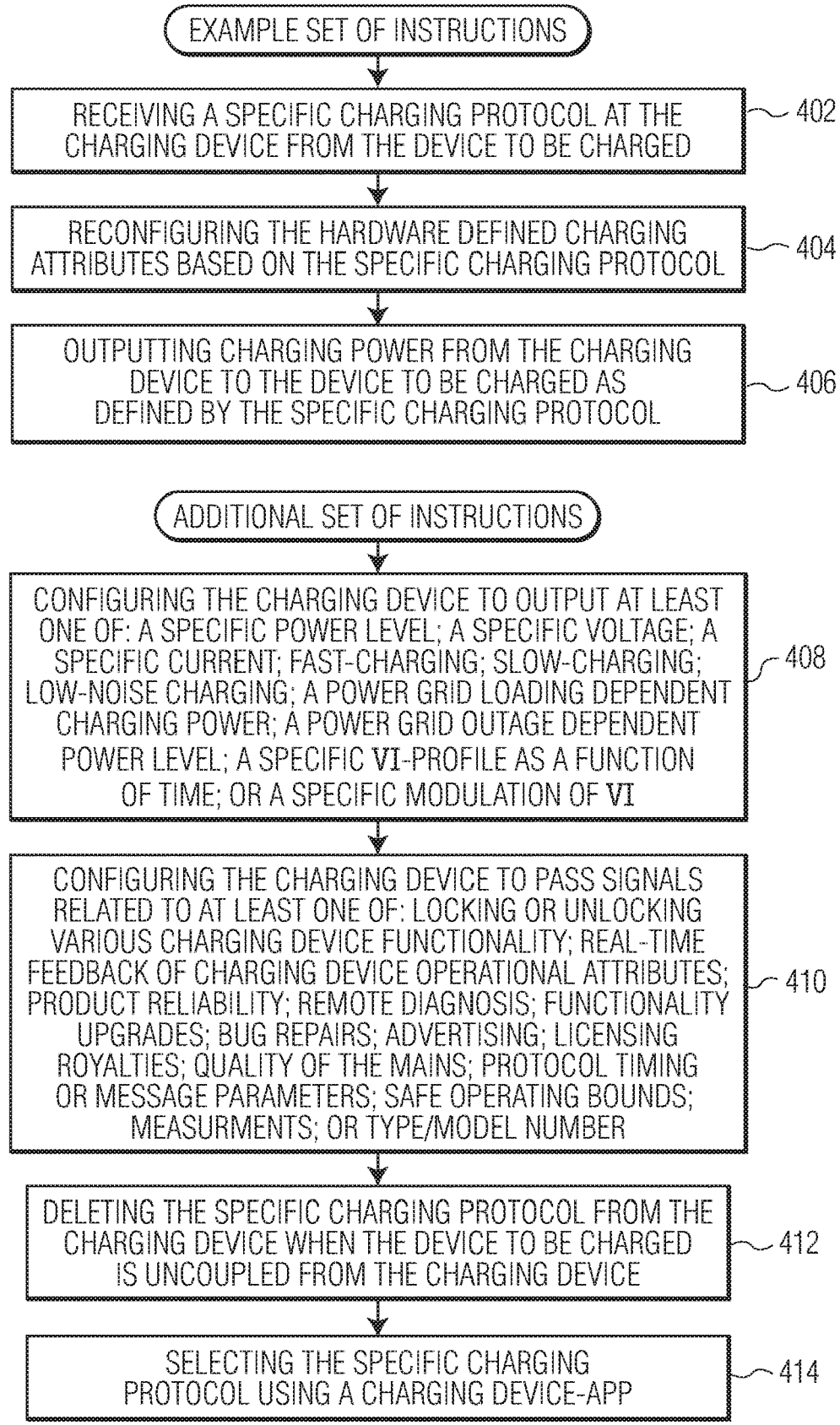
FIG. 4 is an example set of instructions for operating a $3^{rd}$ generation charging system.

FIG. 4 is an example set of instructions for operating a $3^{rd}$ generation charging system. The order in which the instructions are discussed does not limit the order in which other example embodiments implement the instructions unless otherwise specifically stated. Additionally, in some embodiments the instructions are implemented concurrently.

A first example instruction set begins in 402 by receiving a specific charging protocol at the charging device from the device to be charged. Next in 404 reconfiguring the hardware defined charging attributes based on the specific charging protocol. Then in 406 outputting charging power from the charging device to the device to be charged as defined by the specific charging protocol.

The instructions can be augmented or replaced with one or more of the following additional instructions, presented in no particular order: 408—Configuring the charging device to output at least one of: a specific power level; a specific voltage; a specific current; fast-charging; slow-charging; low-noise charging; a power grid loading dependent charging power; a power grid outage dependent power level; a specific VI-profile as a function of time; or a specific modulation of VI; 410—Configuring the charging device to pass signals related to at least one of: locking or unlocking various charging device functionality; real-time feedback of charging device operational attributes; product reliability; remote diagnosis; functionality upgrades; bug repairs; advertising; licensing royalties; quality of the mains; protocol timing or message parameters (e.g. communication time-out value, message length and format); safe operating bounds; measurements (e.g. temperature, voltage, current, etc.); or type/model number; 412—Deleting the specific charging protocol from the charging device when the device to be charged is uncoupled from the charging device; and 414—Selecting the specific charging protocol using a charging device-app.

Figure 5:
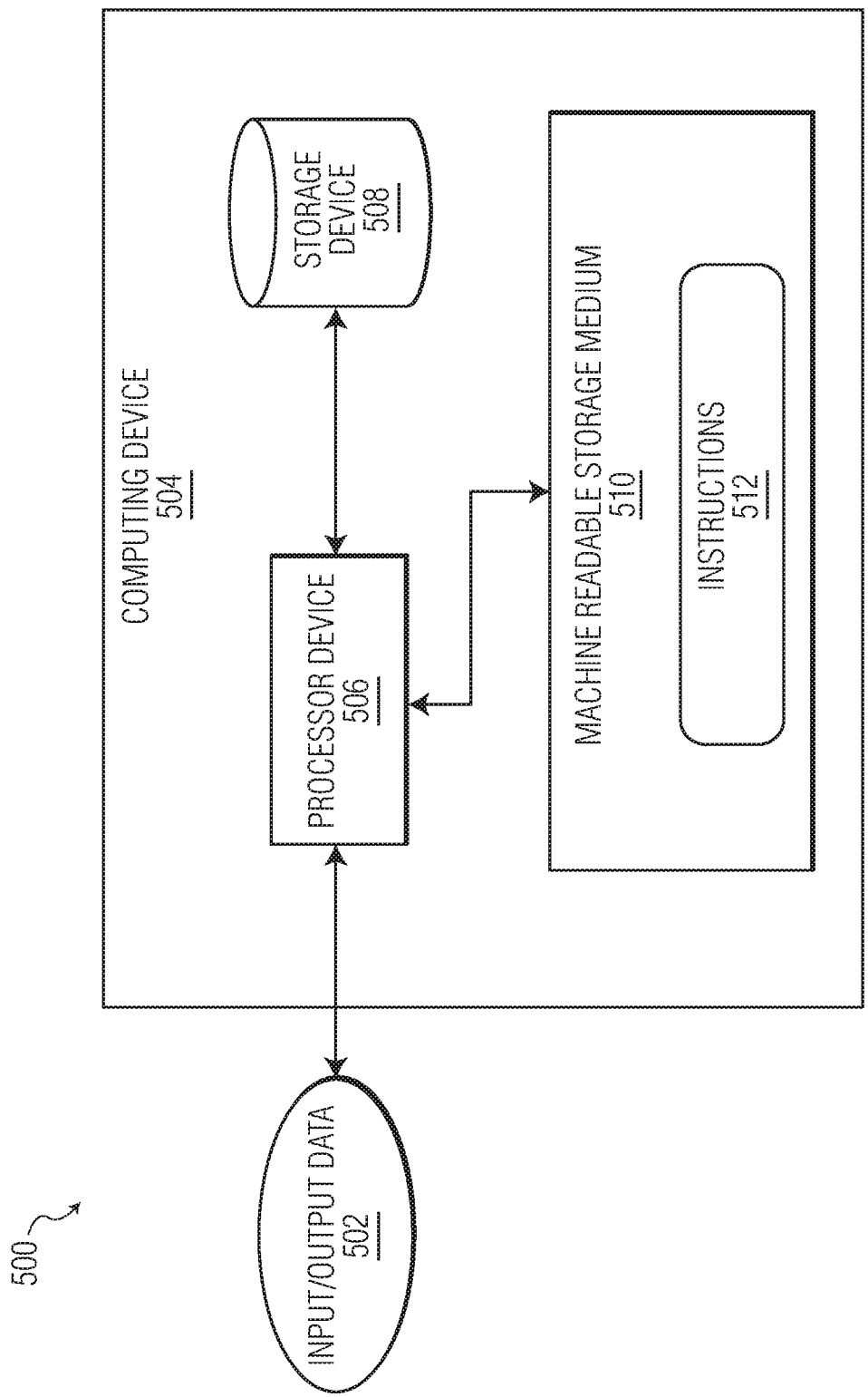
FIG. 5 is an example system for hosting instructions for operating a $3^{rd}$ generation charging system.

FIG. 5 is an example system 500 for hosting instructions for operating a $3^{rd}$ generation charging system. The system 500 shows an input/output data 502 interface with an electronic apparatus 504. The electronic apparatus 504 includes a processor 506, a storage device 508, and a non-transient machine-readable storage medium 510. The machine-readable storage medium 510 includes instructions 512 which control how the processor 506 receives input data 502 and transforms the input data into output data 502, using data within the storage device 508. Example instructions 512 stored in the machine-readable storage medium 510 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

The instructions in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions described above are implemented as functional and software instructions. In other embodiments, the instructions can be implemented either using logic gates, application specific chips, firmware, as well as other hardware forms.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A charging system, comprising:
a charging device configured to be coupled to a device to be charged, wherein the charging device includes a set of hardware defined charging attributes, and is configured to reconfigure the hardware defined charging attributes by enabling and disabling a set of fixed circuits based on a specific charging protocol received from the device to be charged and output charging power to the device to be charged as defined by the specific charging protocol.

2. The system of claim 1, wherein the specific charging protocol configures the charging device to output at least one of: a specific power level; a specific voltage; a specific amperage; fast-charging; slow-charging; low-noise charging; a power grid loading dependent charging power; a power grid outage dependent power level; a specific VI-profile as a function of time; or a specific modulation of VI.

3. The system of claim 1, wherein the specific charging protocol configures the charging device to pass signals related to at least one of: locking or unlocking various charging device functionality; real-time feedback of charging device operational attributes; product reliability; remote diagnosis; functionality upgrades; bug repairs; advertising; licensing royalties; quality of the mains; protocol timing or message parameters; safe operating bounds; measurements; or type/model number.

4. The system of claim 1, wherein the specific charging protocol does not identify the device to be charged.

5. The system of claim 1, wherein the specific charging protocol is not stored in the charging device while the charging device and the device to be charged are uncoupled.

6. The system of claim 1, wherein the charging device is configured to delete the specific charging protocol from the charging device when the device to be charged is uncoupled from the charging device.

7. The system of claim 1, wherein the charging device is configured to execute the specific charging protocol as a set of input values which constrain the set of hardware defined charging attributes.

8. The system of claim 1, wherein the device to be charged is prevented from permanently disabling the set of hardware defined charging attributes.

9. The system of claim 1, wherein the device to be charged charges an internal power storage device with the charging power.

10. The system of claim 1, wherein the device to be charged has a maximum input charging power; wherein the charging device has a maximum output charging power; and wherein the charging device is configured to output an actual charging power based on a human interface input on the device to be charged.

11. The system of claim 10, wherein the actual charging power is less than the maximum input charging power and the maximum output charging power.

12. The system of claim 10, wherein the actual charging power is set to a first charging power in response to a first user payment, and to a second charging power in response to a second user payment.

13. The system of claim 1, wherein the device to be charged selects the specific charging protocol using a charging device-app downloaded from a network.

14. The system of claim 1, wherein the specific charging protocol includes at least one of: a direct charging protocol (DCP); battery monitoring and control; power waveform generation; mains communications connectivity; a safety protocol; and a security protocol.

15. A method for charging, using a charging device configured to be coupled to a device to be charged, wherein the charging device includes a set of hardware defined charging attributes, comprising:
receiving a specific charging protocol at the charging device from the device to be charged; reconfiguring the hardware defined charging attributes based on the specific charging protocol by enabling and disabling a set of fixed circuits; and
outputting charging power from the charging device to the device to be charged as defined by the specific charging protocol.

16. The method of claim 15, wherein the specific charging protocol configures the charging device to output at least one of: a specific power level; a specific voltage; a specific amperage; fast-charging; slow-charging; low-noise charging; a power grid loading dependent charging power; a power grid outage dependent power level; a specific VI-profile as a function of time; or a specific modulation of VI.

17. The method of claim 15, wherein the specific charging protocol configures the charging device to pass signals related to at least one of: locking or unlocking various charging device functionality; real-time feedback of charging device operational attributes; product reliability; remote diagnosis; functionality upgrades; bug repairs; advertising; licensing royalties; quality of the mains; protocol timing or message parameters; safe operating bounds; measurements; or type/model number.

18. The method of claim 15, further comprising:
deleting the specific charging protocol from the charging device when the device to be charged is uncoupled from the charging device.

19. The method of claim 15, further comprising:
selecting the specific charging protocol using a charging device-app.

* * * * *